United States Patent [19]
Park et al.

[11] Patent Number: 5,945,793
[45] Date of Patent: Aug. 31, 1999

[54] DISPLAY DEVICE HAVING SET PROTECTION FUNCTION UPON GENERATION OF ABNORMAL VOLTAGE

[75] Inventors: Tae-Jin Park; Ho-Jin Byun, both of Kyungki-do, Rep. of Korea

[73] Assignee: SamSung Electronics Co., Ltd., Kyungki-do, Rep. of Korea

[21] Appl. No.: 08/805,334

[22] Filed: Feb. 24, 1997

[30] Foreign Application Priority Data

Feb. 24, 1996 [KR] Rep. of Korea ........................ 96-4540
Mar. 8, 1996 [KR] Rep. of Korea ........................ 96-6137

[51] Int. Cl.$^6$ ................................ H04N 3/18; H04N 3/20
[52] U.S. Cl. ............................................ 315/411; 315/408
[58] Field of Search ..................... 315/408, 386, 315/411

[56] References Cited

U.S. PATENT DOCUMENTS

| | | | |
|---|---|---|---|
| 3,629,644 | 12/1971 | Waybright | 315/22 |
| 3,749,966 | 7/1973 | Ahrens et al. | 315/27 TD |
| 4,047,078 | 9/1977 | Meehan | 315/411 |
| 4,063,133 | 12/1977 | Nero et al. | 315/370 |
| 4,074,323 | 2/1978 | Griffey | 358/243 |
| 4,090,111 | 5/1978 | Suzuki | 315/411 |
| 4,291,257 | 9/1981 | Bohringer | 315/408 |
| 4,459,517 | 7/1984 | Hicks | 315/408 |
| 5,034,665 | 7/1991 | Wignot et al. | 315/386 |

*Primary Examiner*—Edward P. Westin
*Assistant Examiner*—Shane R Gardner
*Attorney, Agent, or Firm*—Robert E. Bushnell, Esq.

[57] ABSTRACT

A display device having a set protecting function upon generation of an abnormal voltage includes a horizontal deflection circuit for providing a horizontal signal to a deflection yoke connector, a high voltage output circuit for supplying a high voltage to an anode in accordance with an oscillating signal applied from the horizontal deflection circuit, a power supply circuit for supplying power to the horizontal deflection circuit, and an abnormal voltage detector disposed between the deflection yoke connector, and the high voltage output circuit and the power supply circuit, for detecting whether the deflection yoke connector is connected and whether a part of the high voltage output circuit is damaged, to thereby control a power output of the power supply circuit in accordance with a detected result.

24 Claims, 9 Drawing Sheets

DISPLAY DEVICE HAVING SET PROTECTION FUNCTION UPON GENERATION OF ABNORMAL VOLTAGE

CLAIM FOR PRIORITY UNDER 35 U.S.C. §119

This application makes reference to, incorporates the same herein, and claims all benefits accruing under 35 U.S.C. §119 from an application for Display Device Having Set Protection Function Upon Generation Of abnormal Voltage earlier filed in the Korean Industrial Property Office on the $24^{th}$ of February and $8^{th}$ of March 1996, and there duly assigned Serial Nos. 96-4540 and 96-6137 respectively.

BACKGROUND OF THE INVENTION

1. Technical Field

The present invention relates to a display device, more particularly relates to a cathode-ray tube (CRT) type of display device having a set protecting function for sensing an abnormal voltage generated from a horizontal deflection circuit and a high voltage output circuit and for providing reliable protection of the same circuits based upon the sensed abnormal voltage.

2. Background Art

Generally, a display device such as a CRT type of monitor is a peripheral device which processes information data received from an information data system such as a computer system and provides a visual display of processed information data on a screen. Such a monitor is typically available in either black and white which is known as a monochrome monitor or high resolution color which is known as a color graphics adapter (CGA), video graphics adapter (VGA) and enhanced graphics adapter (EGA) monitor. Monochrome, CGA, and EGA monitors provide a visual display of graphics data by processing digital signals. VGA monitors, by contrast, provide a visual display of graphics data by processing analog signals. In all display devices, the video signal is typically received from a video card installed in an information data system in accordance with vertical and horizontal synchronization signals for a visual display.

A display device can generally include a micro-processor which receives the vertical and horizontal synchronization signals from the video card to control the visual display of information data on a screen, and vertical and horizontal deflection circuits which respectively receive the vertical and horizontal synchronization signals to perform a vertical and horizontal deflection, such that an electron beam generated from an electron gun of a CRT is deflected in a regular sequence from an upper left portion to a lower right portion of the CRT by way of a deflection yoke in order to form an image. Using high voltage technology, a high voltage generating circuit such as disclosed, for example, in U.S. Pat. No. 5,438,245 for High Voltage Generating Circuit issued to Kii et al., is included to stably supply a high voltage to an anode of the CRT for forming an image in response to a flyback pulse generated from the horizontal deflection circuit. A video amplifier then serves to amplify video signals R, G and B transmitted from the video card to approximately 40 Vpp–60 Vpp for providing energy to each picture.

In such a display device, deflection circuits perform either an electrostatic deflection using an electric field or an electromagnetic deflection using a magnetic field. As a result, an image is formed on the CRT type of monitor from the electron beam projected onto a fluorescent surface of the monitor by flowing a toothed waveform of electric current into horizontal and vertical coils using the electromagnetic deflection. An example of such a horizontal deflection circuit is disclosed in U.S. Pat. No. 4,263,615 for Horizontal Drive Circuit For Video Display issued to Steinmetz et al. Generally, the horizontal deflection circuit includes a horizontal oscillating circuit, a horizontal drive circuit and a horizontal deflection output circuit, and operates in conjunction with a high voltage drive circuit serving as a load circuit for generating an output horizontal signal to a deflection yoke connector of the CRT monitor.

When an LC resonance circuit is used as a load circuit in the output terminal of the horizontal deflection circuit, and if the load circuit is cut off, all energy is concentrated on the horizontal deflection output circuit without a discharging loop. As a result, the horizontal deflection output circuit will become unavoidedly destroyed. Moreover, in the event where the deflection yoke connector is deviated or disconnected from the CRT monitor during assembly, or when power is applied to the display device in the situation where the deflection yoke connector is deviated or disconnected from the CRT monitor due to external impact, the horizontal deflection circuit will also be damaged. Further, when the pattern of the high voltage output circuit is disconnected or cracked, the high voltage output circuit will also be destroyed.

One recent technique to protect operation of the horizontal deflection output circuit from such destruction based on our experience is to connect a deflection yoke connector acting as a direct load against the horizontal deflection output circuit to an exterior of a circuit substrate, so that if the deflection yoke connector is loose, power supplied to the input terminal of the horizontal deflection output circuit can be cut off. While this technique provides some reliable protection for the horizontal deflection output circuit, the horizontal deflection output circuit cannot be fully protected when the deflection yoke connector is not fully connected to the CRT monitor, or when the pattern (soldering-mask) on a circuit substrate ranged from the deflection yoke connector to the load circuit at is disconnected. Accordingly, it has been our observation that further improvements may still be contemplated.

SUMMARY OF THE INVENTION

It is therefore an object of the present invention to provide an improved display device.

It is also an object to provide a display device having a set protecting function, upon generation of an abnormal voltage, for sensing an abnormal voltage generated from a horizontal deflection circuit and a high voltage output circuit and for providing reliable protection of the same circuits based upon the sensed abnormal voltage.

It is further an object to provide a display device having a set protecting function, upon generation of an abnormal voltage, for preventing a horizontal deflection circuit from being destroyed, in the case where power is applied and a deflection yoke connector is deviated and thus disconnected from the CRT.

It is still another object to provide a display device having a set protecting function, upon generation of an abnormal voltage, for preventing a high voltage output circuit from being destroyed, when a high voltage output circuit, that is, a flyback transformer is in an abnormal state.

It is yet another object to provide a display device having a set protecting function, upon generation of an abnormal voltage, for switching a horizontal output circuit into a suspend mode, when the horizontal output circuit is in an abnormal state, to cut off power supplied to the horizontal output circuit, thereby preventing the horizontal output circuit from being destroyed.

In accordance with an aspect of the present invention, a display device having a set protecting function upon generation of an abnormal voltage, includes a power supply circuit for converting an applied alternating current voltage into a direct current voltage; a horizontal deflection circuit comprising a horizontal oscillating circuit for forming a toothed waveform in accordance with charging/discharging of a capacitor by using the direct current voltage supplied from the power supply circuit to thereby oscillate a frequency of the waveformn, a horizontal drive circuit for amplifying an output pulse of the horizontal oscillating circuit to thereby supply a base current sufficient to turn on/off a horizontal output transistor to the horizontal output transistor and for performing waveform correction, a horizontal deflection output circuit for forming a toothed waveform of current through a horizontal deflection yoke in accordance with a switching operation of the horizontal output transistor to which the sufficient current from the horizontal drive circuit is supplied, a load circuit driven by receiving a predetermined energy from the horizontal deflection output circuit; and an abnormal voltage detector for sensing a state of the predetermined energy transmitted to the load circuit, when the deflection yoke of the horizontal deflection output circuit is deviated or when the horizontal deflection circuit is in an abnormal state, to thereby prevent the horizontal deflection circuit from being destroyed.

In accordance with another aspect of the present invention, a display device having a set protecting function upon generation of an abnormal voltage, includes a horizontal deflection circuit for providing a horizontal signal to a deflection yoke connector, a high voltage output circuit for supplying a high voltage to an anode in accordance with an oscillating signal applied from the horizontal deflection circuit, and a power supply circuit for supplying power to the horizontal deflection circuit. The display device includes an abnormal voltage detector disposed between the deflection yoke connector and the high voltage output circuit and the power supply circuit, for detecting whether the deflection connector is connected and whether apart of the high voltage output circuit is damaged, to thereby control a power output of the power supply circuit in accordance with a detected result.

Preferably, the abnormal voltage detector includes a voltage sensing unit for sensing a state of the predetermined energy of the horizontal deflection output circuit supplied to the load circuit, and a power control unit for controlling the power supplied to the horizontal oscillating circuit from the power supply circuit, when a predetermined reference voltage is not supplied to the load circuit in accordance with a sensing result of the voltage sensing unit.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
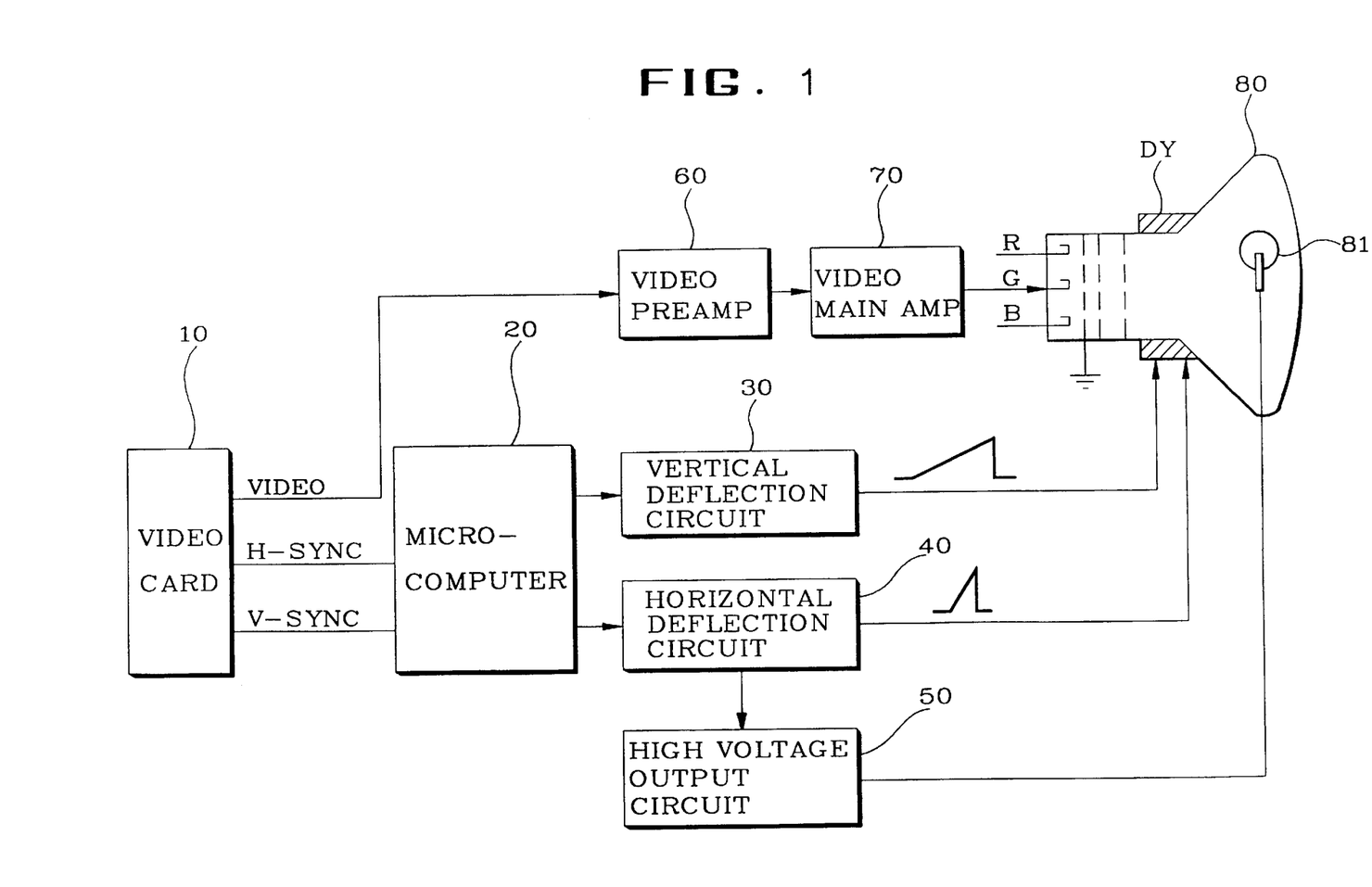
FIG. 1 is a schematic block diagram illustrating an exemplary display device.

Referring now to the drawings and particularly to FIG. 1, which illustrates an exemplary display device such as a CRT monitor for providing a visual display of information data on a screen. The display device includes a video card 10 installed within a computer system (not shown) to supply video signals R, G and B and horizontal/vertical synchronization signals H_SYNC and V_SYNC required for image formation. A micro-computer 20 receives the horizontal/vertical synchronization signals H_SYNC and V_SYNC from the video card 10 to thereby generate a screen control signal for controlling a screen of a monitor. Vertical and horizontal deflection circuits 30 and 40 respectively receive the vertical/horizontal synchronization signals V_SYNC and H_SYNC and respectively perform vertical and horizontal deflection, such that an electron beam generated from an electron gun of a CRT 80 is deflected in regular sequence from an upper left portion to a lower right portion of the CRT 80 by means of a deflection yoke DY to thereby form an image. By using principles of a switching circuit and a high voltage technology, a high voltage output circuit 50 utilizes a flyback pulse generated from an output terminal of the horizontal deflection circuit 40 to thereby provide a high voltage to an anode of the CRT 80. A video preamplifier 60 serves to amplify the video signals R, G and B transmitted from the video card 10, to thereby hold a predetermined voltage level. A video main amplifier 70 serves to amplify the video signals R, G and B amplified by the video preamplifier 60 to approximately 40 Vpp to 60 Vpp for providing energy to each picture.

In such a display device, deflection circuits perform either an electrostatic deflection using an electric field or an electromagnetic deflection using a magnetic field. As a result, an image is formed on the CRT type of monitor from the electron beam projected onto a fluorescent surface thereof and by flowing a toothed waveformn of electric current into horizontal and vertical coils using the electromagnetic deflection.

Figure 2:
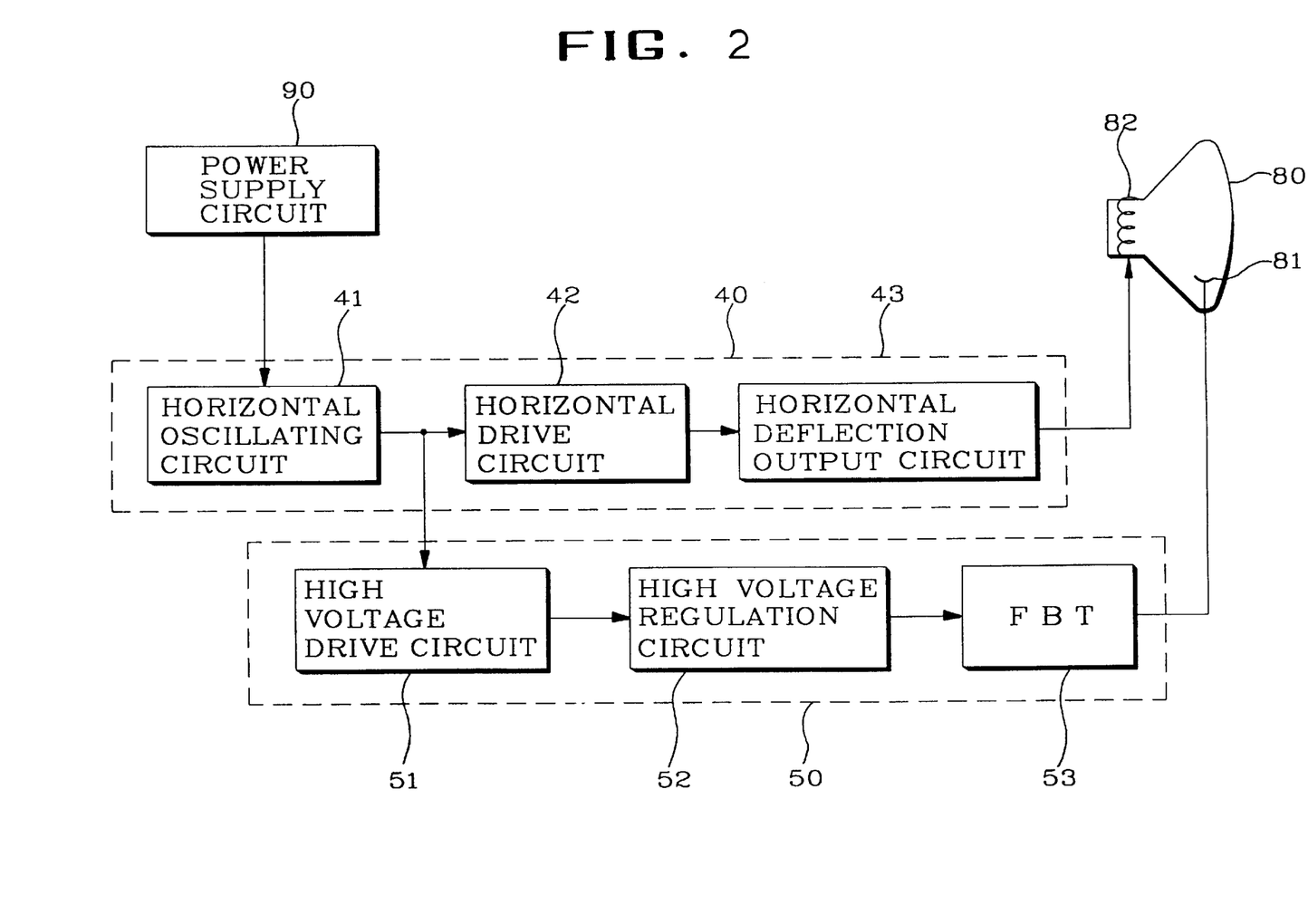
FIG. 2 is a block diagram illustrating a horizontal deflection circuit and peripheral circuits of the exemplary display device as shown in FIG. 1.

FIG. 2 illustrates a construction of a horizontal deflection circuit 40 and peripheral circuits such as a high voltage output circuit 50 as shown in FIG. 1 and a power supply circuit 90. In such a construction, the horizontal deflection circuit 40, which includes a horizontal oscillating circuit 41, a horizontal drive circuit 42 and a horizontal deflection output circuit 43, serves to output a horizontal signal to a deflection yoke connector 82.

The horizontal oscillating circuit 41 forms a toothed wave according to a charging/discharging characteristic of a capacitor by using the power supplied from the power supply circuit 90, and oscillates a frequency of the toothed waveform. The horizontal drive circuit 42 buffers and amplifies an output pulse of the horizontal oscillating circuit 41 and thus supplies a base current sufficient to switch a horizontal output transistor and executes waveform correction. The horizontal deflection output circuit 43 forms a toothed waveform of current through the horizontal deflection yoke in accordance with a switching operation of the horizontal output transistor to which the sufficient current from the horizontal drive circuit 42 is supplied.

The high voltage output circuit 50 includes a high voltage drive circuit 51, a high voltage regulation circuit 52 and a flyback transformer (FBT) 53. The high voltage output circuit 50 is a circuit which supplies a stable direct current DC voltage to the anode 81 of CRT 80 and obtains a high voltage using a flyback collector.

The horizontal deflection circuit 40 and the high voltage output circuit 50 may be integrated into a single device for ease of construction and low production cost. However, the integrated device is less effective in regulating high voltage application. While individual horizontal deflection circuit 40 and high voltage output circuit 50 are generally more costly and more complex in terms of circuit construction, they are highly effective in regulation high voltage application, and are widely applicable for high resolution CRT monitors.

In the case where a LC resonance circuit, which includes a resistor and a coil, is used as a load circuit in the output terminal of the horizontal deflection circuit 40, if the load circuit is cut off, all energy is concentrated on the horizontal deflection output circuit 43 at which a discharging loop is not formed. As a result, the horizontal deflection output circuit 43 will be unavoidedly destroyed.

Moreover, in the case where the deflection yoke connector 82 is deviated and disconnected during assembly, or in the case where power is applied to the display device in the situation where the deflection yoke connector 82 is deviated and disconnected due to external impacts, the horizontal deflection circuit 40 will be damaged. Further, in the case that the pattern of the high voltage output circuit 50 is disconnected or cracked, there also occurs a problem in that the high voltage output circuit 50 will also be destroyed.

Figure 3:
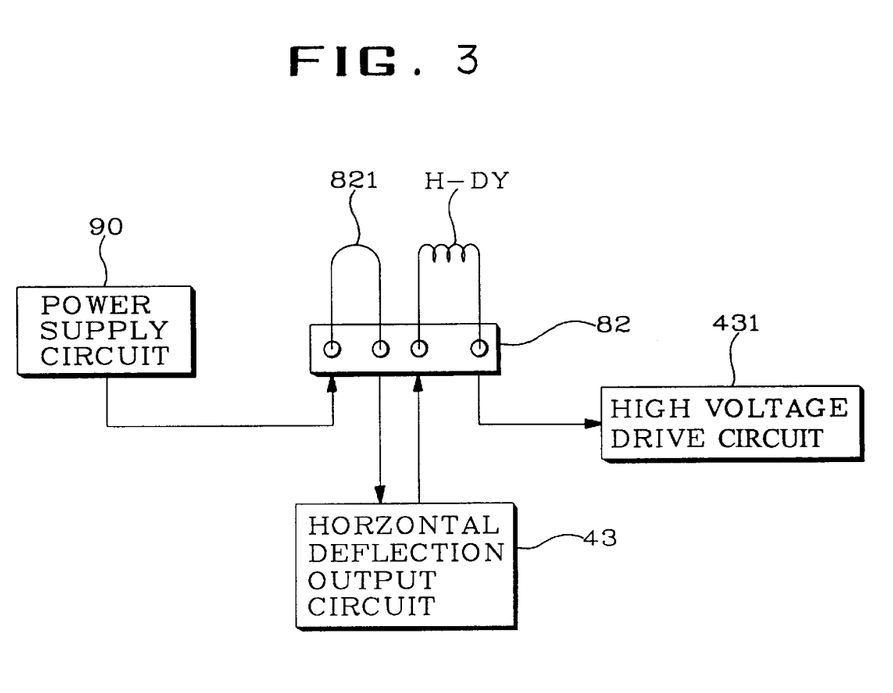
FIG. 3 is a block diagram illustrating a circuit construction for protecting the horizontal deflection output circuit.

One recent technique to protect operation of the horizontal deflection output circuit from such destruction is shown in FIG. 3 based on our experience connecting a deflection yoke connector acting as a direct load against the horizontal deflection output circuit to an exterior of a circuit substrate, so that if the deflection yoke connector is loose, power supply to the input terminal of the horizontal deflection output circuit can be cut off. As shown in FIG. 3, the power supply circuit 90 and an input terminal of the horizontal deflection output circuit 43 are connected to a jump line 821 of the deflection yoke connector 82. Likewise, an output terminal of the horizontal deflection output circuit 43 and an input terminal of a high voltage drive circuit 431 are connected through the horizontal deflection yoke H_DY made between remaining two terminals of the connector 82. When the deflection yoke DY acting as a direct load against the horizontal deflection output circuit 43 is connected to an exterior of a circuit substrate, if the deflection yoke connector DY is manually removed or loosely inserted, the horizontal deflection output circuit 43 can be naturally protected. Namely, in the case where the connector 82 has been removed, power of the power supply circuit 90 to be supplied, through the jump line 821, to the input terminal of the horizontal deflection output circuit 43 can be cut off in order to protect the horizontal deflection output circuit 43. While this technique provides some reliable protection for the horizontal deflection output circuit 43, the horizontal deflection output circuit 43 cannot be fully protected when the jump line 821 is connected but the deflection yoke DY is not completely connected to the CRT monitor, or when the pattern (soldering-mask) on a circuit substrate ranged from the deflection yoke connector to the load circuit is disconnected.

Figure 4:
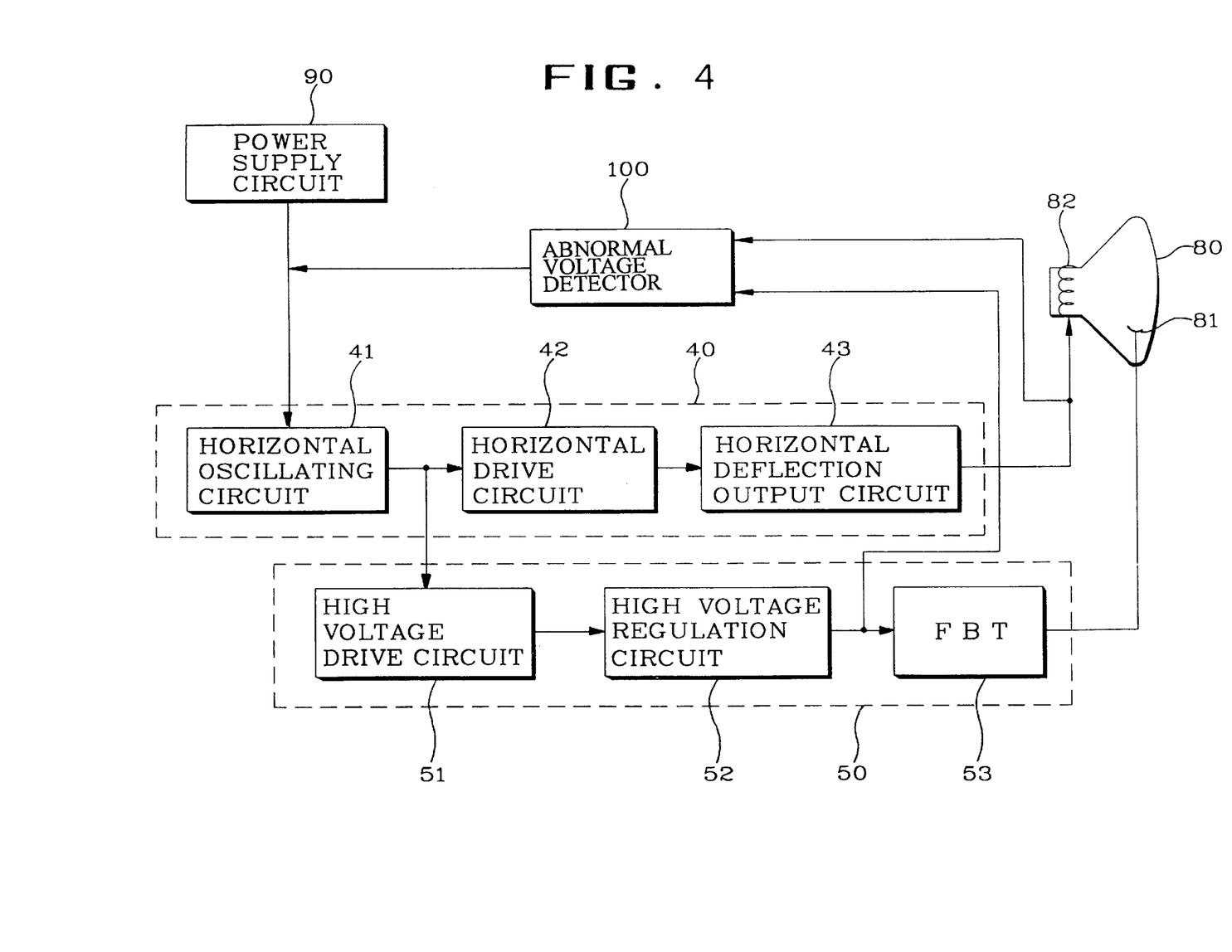
FIG. 4 is a block diagram illustrating a preferred embodiment of a display device constructed according to the principles of the present invention.

Turning now to FIG. 4 which illustrates a display device constructed according to a preferred embodiment of the present invention. The display device includes all the circuit components of that of FIG. 2, such as a horizontal deflection circuit 40 including a horizontal oscillating circuit 41, a horizontal drive circuit 42, a horizontal deflection output circuit 43, a high voltage output circuit 50 including a high voltage drive circuit 51, a high voltage regulation circuit 52, a flyback transformer FBT 53, a CRT 80 including a deflection yoke connector 82 and a power supply circuit 90, but further includes an abnormal voltage detector 100 for detecting whether a connection of a horizontal output circuit 43 and a deflection yoke connector 82 is abnormal. The abnormal voltage detector 100 also has an input which is connected between a high voltage regulation circuit 52 and a flyback transformer FBT 53, for detecting whether a connection therebetween is abnormal. The abnormal voltage detector 100 produces an output signal for controlling the power supply circuit 90, to thereby control the power supply to the horizontal oscillating circuit 41.

Figure 5:
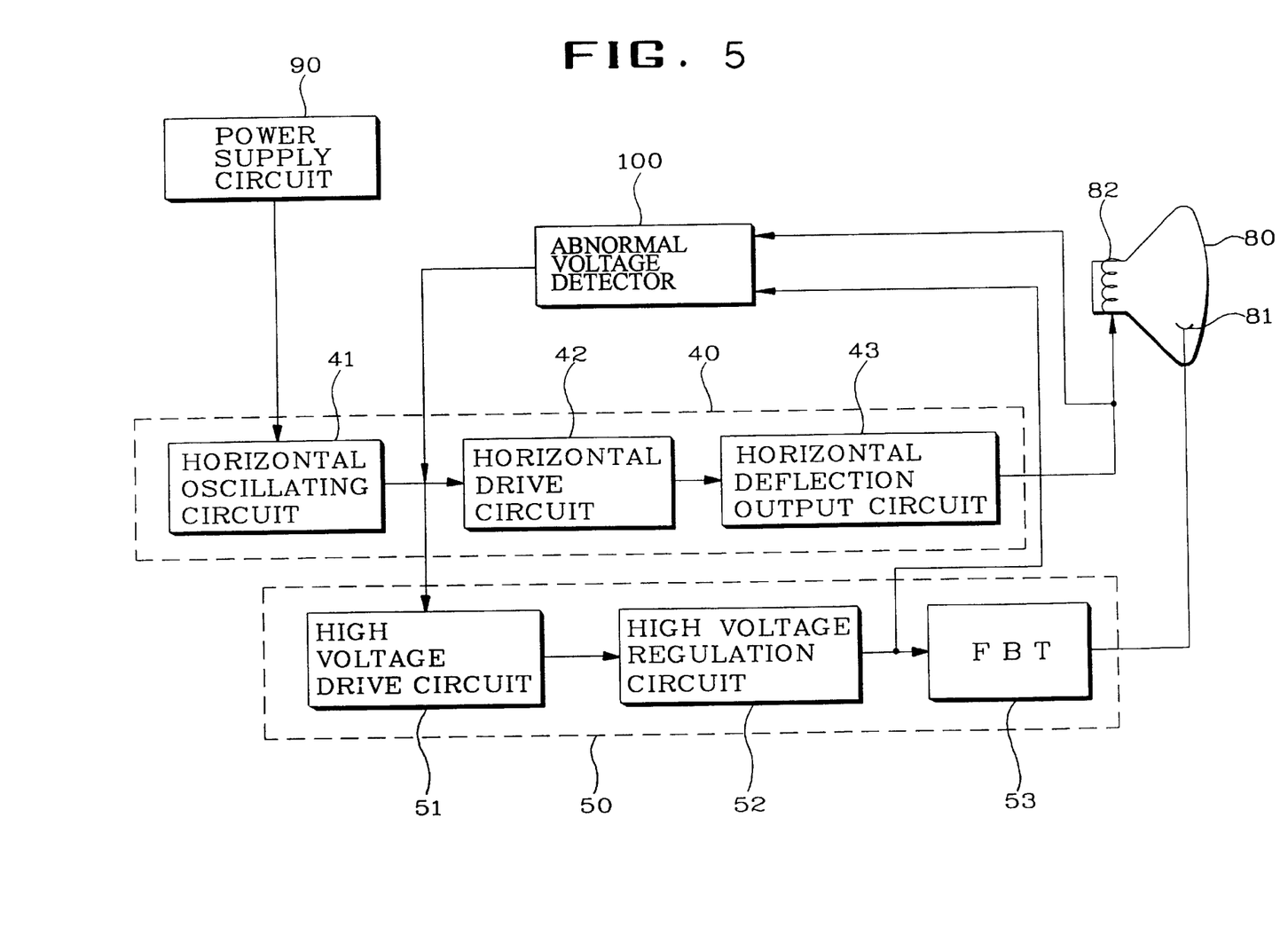
FIG. 5 is a block diagram illustrating another embodiment of the display device constructed according to the principles of the present invention.

FIG. 5 illustrates a display device constructed according to another embodiment of the present invention. The construction of the display device of FIG. 5 is considerably similar to that of FIG. 4 in which the output signal from the abnormal voltage detector 100 inhibits the power from being supplied from the power supply circuit 90 to the horizontal oscillating circuit 41. However, the output signal from the abnormal voltage detector 100, as shown in FIG. 5, is transmitted between the horizontal oscillating circuit 41 and the horizontal drive circuit 42.

Figure 6:
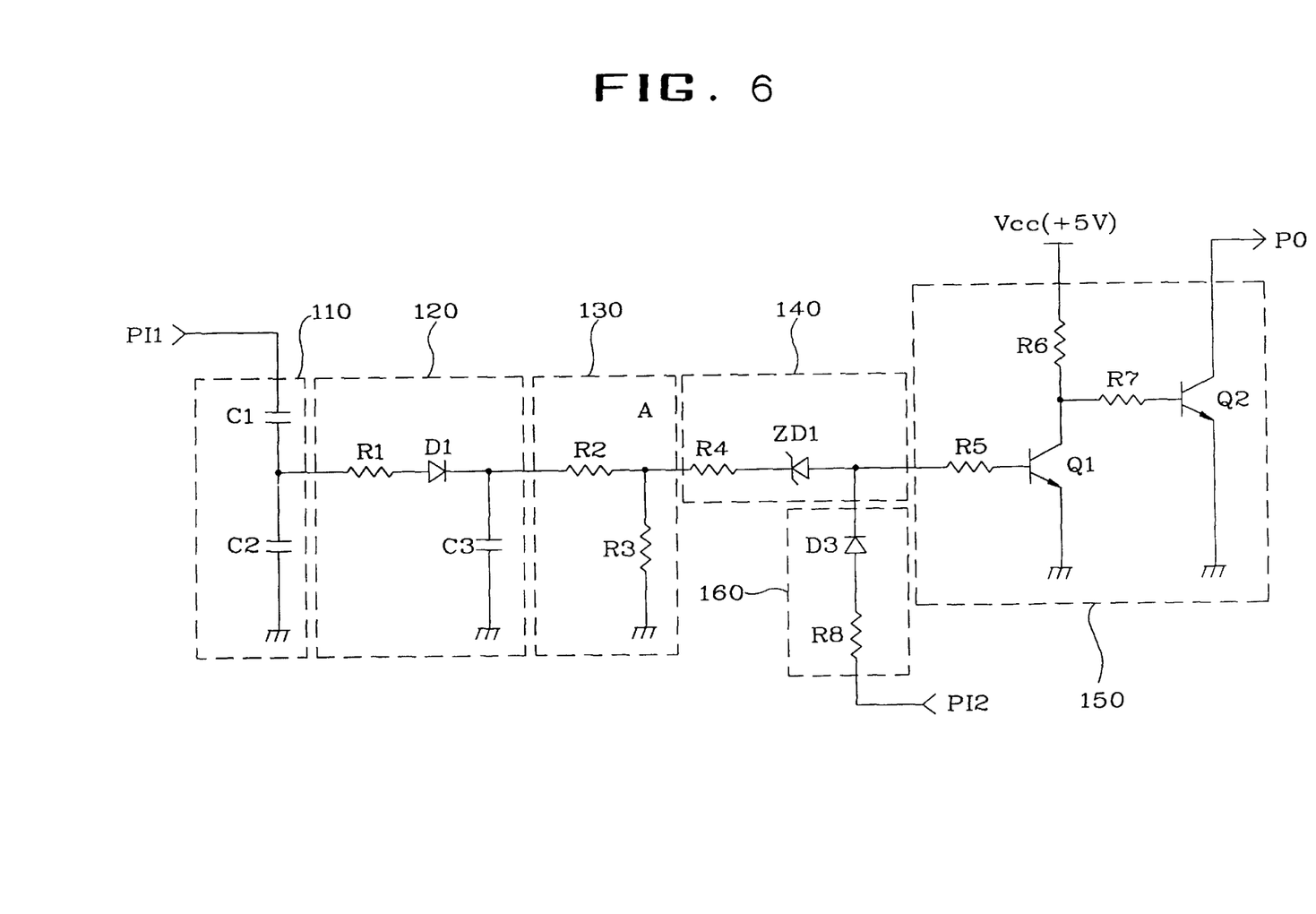
FIG. 6 is a detailed circuit diagram illustrating a preferred embodiment of an abnormal voltage detector of FIGS. 4 and 5 constructed according to the principles of the present invention.

Refer now to FIG. 6 which illustrates an abnormal voltage detector 100 constructed according to the principles of the present invention. As shown in FIG. 6, the abnormal voltage detector 100 includes a first pulse input unit 110, a rectifier 120, a voltage divider 130, a switching control unit 140, a switching unit 150 and a second pulse input unit 160.

The first pulse input unit 110 includes a plurality of capacitors C1 and C2 and converts a flyback pulse applied to an input terminal PI1 into a low voltage according to the connection of the deflection yoke connector 82 so as to generate a converted flyback pulse to the rectifier 120. The input terminal PI1 of the first pulse input unit 110 is connected to an intermediate connection point "B" between the high voltage regulation circuit 52 and the transformer FBT 53 to receive the flyback pulse for conversion, and the input terminal PI2 of the second pulse input unit 160 is connected to a connection point "A" between the horizontal deflection output circuit 43 and the deflection yoke 82.

The rectifier 120 is comprised of a resistor R1, a diode D1 and a capacitor C3 and serves to rectify the low voltage applied from the first pulse input unit 110 to convert the rectified pulse into a direct current voltage, thereby outputting the converted voltage to the voltage divider 130. The voltage detected by the resistor R1 from the connection point between the capacitors C1 and C2 is rectified and smoothed through the diode D1 and the capacitor C3.

The voltage divider 130 is comprised of resistors R2 and R3 and serves to divide the direct current voltage applied from the rectifier 120 through the resistors R2 and R3, thereby applying the divided voltage to point D to the switching control unit 140. The switching control unit 140 is comprised of a resistor R4 and a Zener diode ZD1. The resistor R4 functions to detect the voltage applied from the voltage division unit 130 to thereby determine whether the Zener diode ZD1 is turned on/off. At the time, whether the Zener diode ZD1 is turned on/off is determined upon a comparison of the voltage applied from the resistor R4 with a reference voltage applied at point C from the second pulse input unit 160. The switching control current applied from the Zener diode ZD1 is supplied to a resistor R5 of the switching unit 150.

The switching unit 150 includes a plurality of resistors R5 to R7 and a plurality of transistors Q1 and Q2 and is switched in accordance with the switching control current applied at point C from the switching control unit 140, to thereby output a control signal to the output terminal PO thereof. The second pulse input unit 160 is comprised of a diode D3 and a resistor R8 and applies a rectangular pulse input through the input terminal PI2 to produce a reference voltage at point "C" of the switching control unit 140.

In operation, when the first pulse input unit 110 first receives the flyback pulse applied according to the connection of the deflection yoke connector 82 through the input terminal PI1 thereof, it converts the flyback pulse into the low voltage of flyback pulse by means of the condensers C1 and C2 and produces the converted flyback pulse to the rectifier 120. The first pulse input unit 110 then receives different voltages in accordance with the connection of the deflection yoke connector 82.

Meanwhile, when the low voltage of flyback pulse is applied to the rectifier 120, the rectifier 120 rectifies the low voltage of flyback pulse and converts the rectified pulse to the direct current voltage, thereby producing the direct current voltage to the voltage divider 130. Then, the voltage divider 130 divides the direct current voltage applied from the rectifier 20 through the resistors R2 and R3, thereby applying the divided voltage to the switching control unit 140. The resistor R4 in the switching control unit 140 applies the switching control current to the switching unit 150 in accordance with the voltage applied from the voltage divider 130.

In the case where the abnormal voltage detector 100 is normally connected to the deflection yoke connector 82, the voltage through the first flyback pulse input terminal PI1 higher than the reference voltage is applied through point "A" to the Zener diode ZD1 of the switching control unit 140, to thereby apply the switching control current to the switching unit 150. However, in the case where the abnormal voltage detector 100 is not connected to the deflection yoke connector 82, the voltage through the first flyback pulse input terminal PI1 lower than the reference voltage is applied through point "A" to the Zener diode ZD1 of the switching control unit 140, to thereby not apply the switching control current to the switching unit 150.

The switching unit 150 is switched in accordance with the switching control current applied from the switching control unit 140, to thereby output a control signal to the output terminal PO thereof. In the case that the switching control current is applied through the resistor R5 from the switching control unit 140, the transistor Q1 is turned on. Accordingly, the transistor Q2 is turned off, and thus the output signal of the output terminal PO is at a logic "low" level, which is supplied to the power supply circuit 90. In the case that the switching control current is not applied from the switching control unit 140, the transistor Q1 is turned off. A power supply voltage Vcc is divided by the resistors R6 and R7 and then is applied to the base of the transistor Q2. As a result, the transistor Q2 is turned on and outputs a control signal of a logic "high" level to the output terminal PO.

Figure 7:
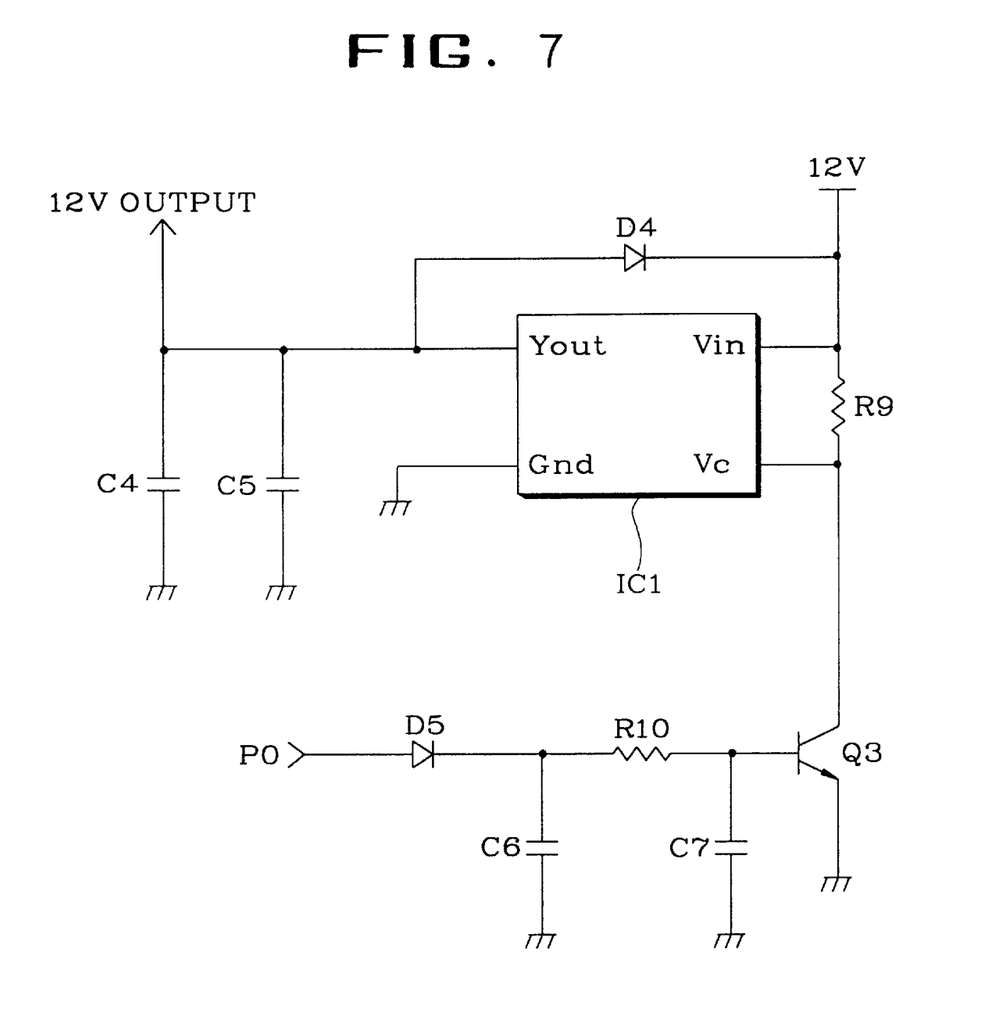
FIG. 7 is a detailed circuit diagram illustrating a power supply circuit which operates in accordance with a control signal of the abnormal voltage detector of FIGS. 4 and 5.

Meanwhile, the power supply circuit 90, as shown in FIG. 7, is connected to the output terminal PO of the switching unit 150. The power supply circuit 90 includes a plurality of resistors R9 and R10, a plurality of capacitors C4 to C7, a plurality of diodes D4 and D5, a transistor Q3 and a voltage adjusting unit IC1.

The power supply circuit 90 adjusts a potential level of 12 V applied using the voltage adjusting unit IC1 and outputs the adjusted voltage to the horizontal deflection circuit 40. The transistor Q3 is turned on/off in accordance with the control signal applied from the output terminal PO of the switching unit 150, such that the power applied to input terminals Vin and Vc of the voltage adjusting unit IC1 is turned on/off. The transistor Q3 controls the power output to the horizontal deflection circuit 40 from the voltage adjusting unit IC1 and previously prevents the destruction of the horizontal deflection circuit caused due to the disconnection of the deflection yoke connector 82. The output signal of the transistor Q2 in the switching unit 150 is applied to the base of the transistor Q3 of the power supply circuit 90.

In the case where the control signal of a logic "low" level is applied through the output terminal PO of the switching unit 150, the transistor Q3 is kept at the turned-off state and applies the potential level of 12 V to the input terminals Vin and Vc of the voltage adjusting unit IC1. As a result, the voltage adjusting unit IC1 applies the potential level of 12 V to the horizontal deflection circuit 40, thereby normally operating the horizontal deflection circuit 40. In the case where the control signal of a logic "high" level is applied through the output terminal PO of the switching unit 150, however, the transistor Q3 is turned on and does not apply the potential level of 12 V to the input terminals Vin and Vc of the voltage adjusting unit IC1. As a result, such the horizontal deflection circuit advances to a suspend mode, thereby previously preventing the destruction of the horizontal deflection circuit 40 caused due to the disconnection of the deflection yoke connector 82.

Meanwhile, the rectangular pulse is applied during a predetermined time, for example, approximately 2 seconds, to the second pulse input unit 160, which accommodates a normal driving during the delay time of period generated when power of a television or a monitor is initially applied. In the case where the deflection yoke connector 82 is disconnected, the horizontal deflection circuit 40 is maintained at the suspend mode, thereby previously preventing the destruction of the horizontal deflection circuit 40 caused due to the disconnection of the deflection yoke connector 82.

In the above embodiment, the output terminal PO of the switching unit 150 is connected to the power supply circuit 90, but it may be connected to a suspend mode circuit, a power-off mode circuit or any other sensing circuit which is capable of performing the same function as the power supply circuit 90. The horizontal deflection circuit 40 may be integrated with the high voltage circuit 50 as a unitary body, but they may be separately disposed, while respectively including the abnormal voltage detector 100.

Figure 8:
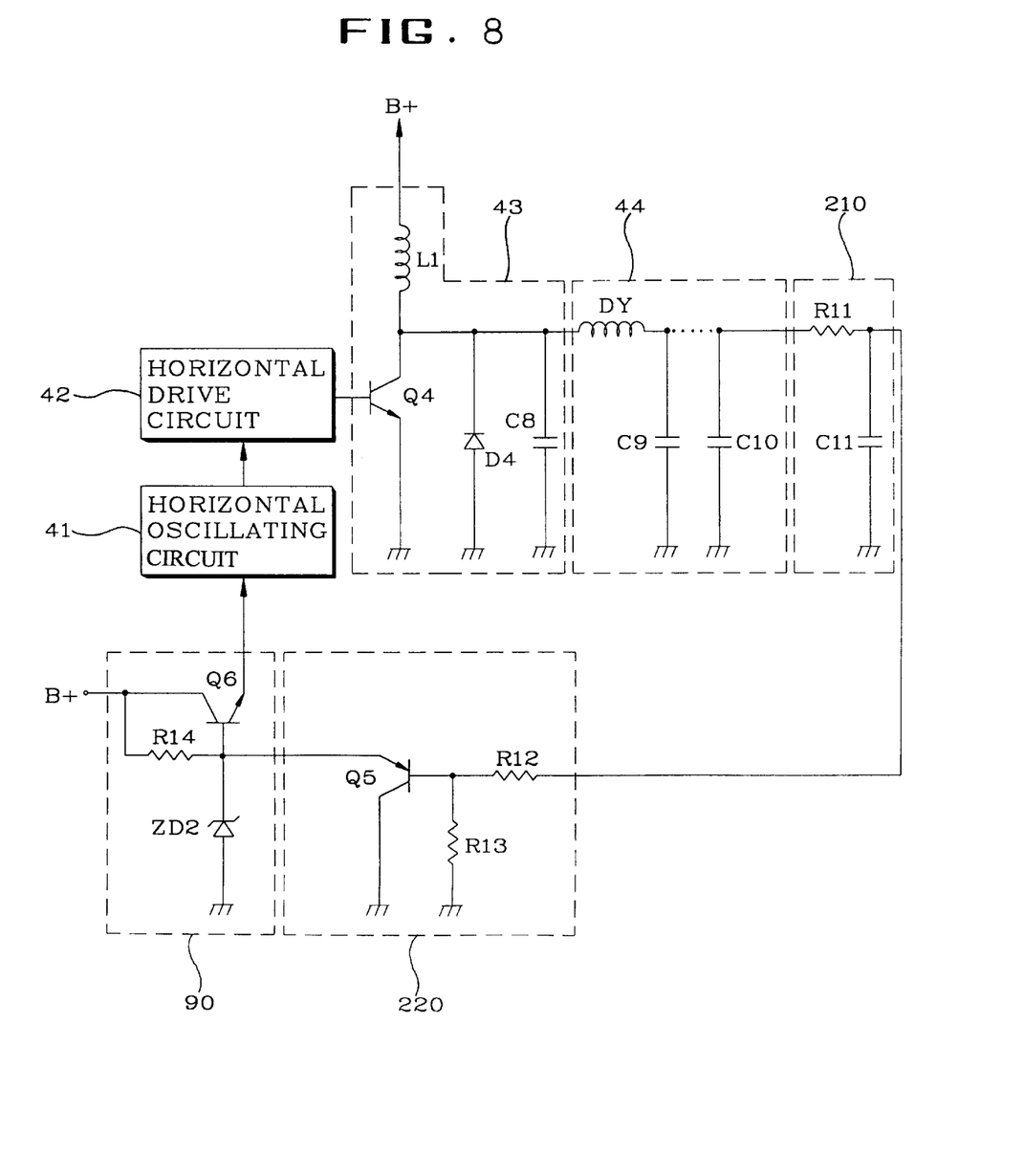
FIG. 8 is a detailed circuit diagram illustrating another embodiment of the abnormal voltage detector of FIGS. 4 and 5 constructed according to the principles of the present invention.

FIG. 8 illustrates another embodiment of the abnormal voltage detector 100 of FIG. 6 in conjunction with the power supply circuit 90 and the horizontal deflection circuit 40 including the horizontal oscillating circuit 41, the horizontal drive circuit 42, and the horizontal deflection output circuit 43. Referring to FIG. 8, the power supply circuit 90 is provided to convert an applied alternating current voltage into a direct current voltage. The horizontal oscillating circuit 41 forms a toothed waveform in accordance with charging/discharging of a capacitor by using the direct current voltage supplied from the power supply circuit 90, to thereby oscillate a frequency of the waveform. The horizontal drive circuit 42 buffers and amplifies an output pulse of the horizontal oscillating circuit 41 to thereby supply a base current sufficient to turn on/off a horizontal output transistor Q4 to the horizontal output transistor Q4 for performing waveform correction. The horizontal deflection output circuit 43 forms a toothed waveform of current through the horizontal deflection yoke 82 in accordance with a switching operation of the horizontal output transistor Q4 to which the sufficient current from the horizontal drive circuit 42 is supplied. A load circuit 44 is driven by receiving a predetermined energy from the horizontal deflection output circuit 43. A voltage sensing unit 210 is connected to the load circuit 44 for sensing a state of the predetermined energy of the horizontal deflection output circuit 43 supplied to the load circuit 44, and a power control unit 220 is connected to the voltage sensing unit 210 for controlling the power supplied to the horizontal oscillating circuit 41 from the power supply circuit 90, when a predetermined reference voltage is not supplied to the load circuit 44, in accordance with a sensing result of the voltage sensing unit 210.

The horizontal deflection output circuit 43 includes a horizontal output transistor Q4, a chopper coil L1 connected to the corrector of the transistor Q4, a damper diode D4 and a smoothing capacitor C8. The voltage sensing unit 210 includes a detecting resistor R11 for detecting the energy transmitted to the load circuit 44, and a capacitor C11. The power control unit 220 includes voltage-divisional resistors R12 and R13 and a first switching transistor Q5 having its base terminal to which the output voltage of the voltage sensing unit 210 is applied and having its emitter terminal connected to the Zener diode ZD2 and a second switching transistor Q6 of the power supply circuit 90.

In operation, when the normal circuit is on, the horizontal deflection output circuit 43 transmits a predetermined energy to the load circuit 44, the voltage sensing unit 210 always senses a predetermined level of voltage. The power supply voltage 90 rectifies the alternative current voltage applied and transmits the voltage as the direct current voltage. The horizontal oscillating circuit 41 forms the toothed wave with the applied direct current voltage by using the charging/discharging of capacitor and oscillates the frequency of wave. The horizontal drive circuit 42 buffers and amplifies an output pulse of the horizontal oscillating circuit 41 to thereby supply a base current sufficient to turn on/off the horizontal output transistor Q4 to the horizontal output transistor Q4. As a result, the horizontal output transistor Q4 receives the sufficient amplified voltage and is then switched.

At the time, the output voltage of the horizontal output transistor Q4 is transmitted to the load circuit 44 including the deflection yoke. The voltage sensing unit 210 outputs a normal operation signal "HIGH" to the power control unit 220, as the predetermined energy is supplied to the detecting resistor R11 and the capacitor C11 within the voltage sensing unit 210. The normal operation signal "HIGH" of the voltage sensing unit 210 is applied to the base of the first switching transistor Q5, and the reference voltage is applied to the emitter thereof through the Zener diode ZD2. Therefore, there is no voltage difference between the base and emitter of the first switching transistor Q5, which makes the first switching transistor Q5 maintained at the turn-off state. While the first switching transistor Q5 is being turned off, the second switching transistor Q6 is also turned off.

In more detail, in the case where the normal energy is transmitted to the voltage sensing unit 210, the power control unit 220 does not operate, such that the power supply circuit 90 normally performs the power supply to the horizontal oscillating circuit 41.

However, in the case where the soldering-mask on the circuit substrate covered from the horizontal deflection circuit 43 to the load circuit 44 and the voltage sensing unit 210 is disconnected or a unit of the load circuit 44 is damaged, the horizontal deflection circuit 43 can not perform the normal energy supply to the load circuit 44. Accordingly, this is sensed by the voltage detecting resistor R11 and the capacitor C11 within the voltage sensing unit 210, which produces a load open signal "LOW". When the load open signal "LOW" is transmitted to the base of the first switching transistor Q5, the transistor Q5 is turned on, and sequentially the second switching transistor Q6 is turned on. At the time, the power supply to the horizontal oscillating circuit 41 from the power supply circuit 90 is stopped. Further, the power concentrated on the horizontal deflection circuit 43 acts as a discharging routine.

Figure 9:
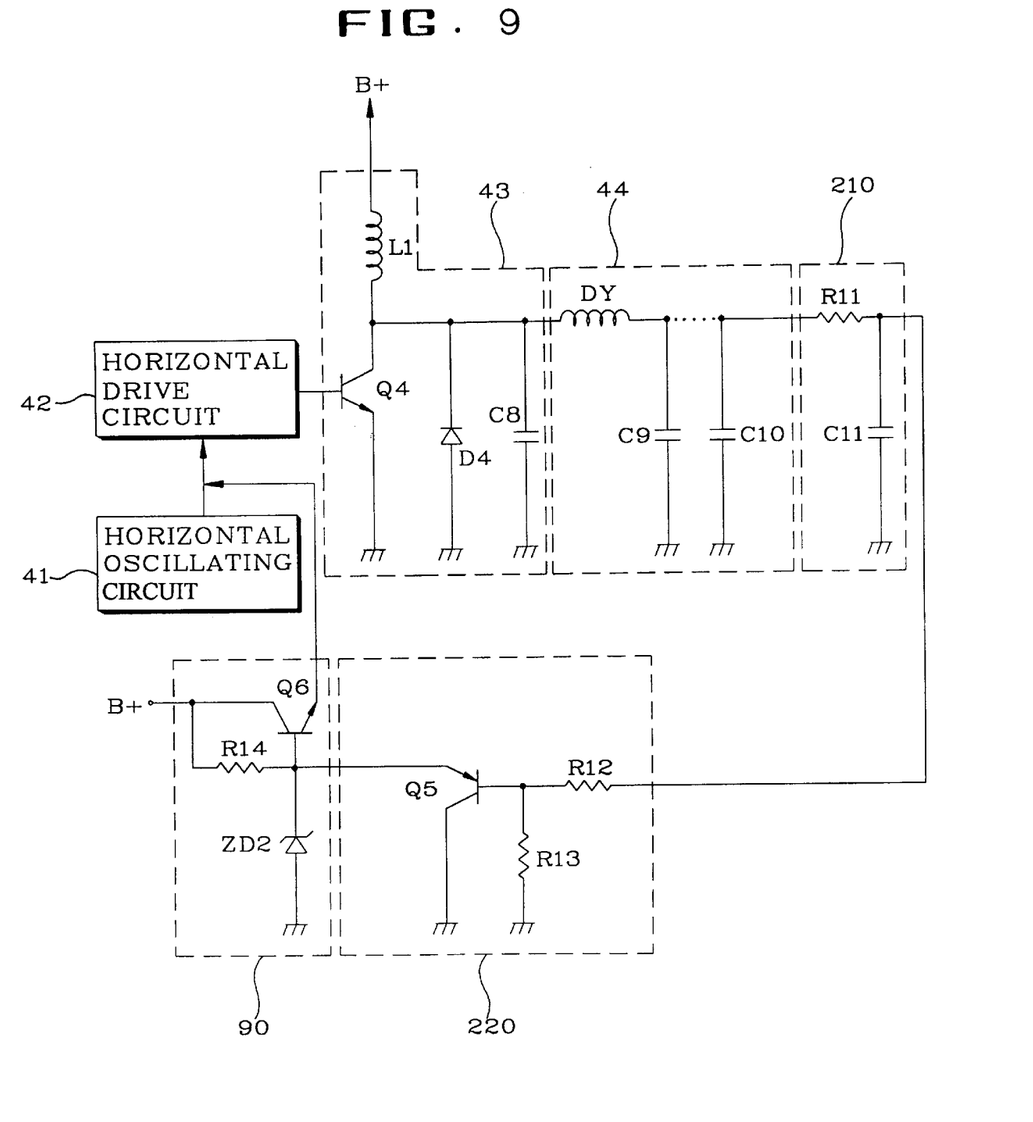
FIG. 9 is a detailed circuit diagram illustrating yet another embodiment of the abnormal voltage detector of FIGS. 4 and 5 constructed according to the principles of the present invention.

FIG. 9 is a detailed circuit diagram illustrating another embodiment of the abnormal voltage detector of FIG. 8. As shown in FIG. 9, the circuit construction of this embodiment is substantially identical to that of FIG. 8, excepting that the power cut-off line by the collector of the second switching transistor Q6 is connected to the horizontal drive circuit 42, instead of the horizontal oscillating circuit 41. That is, when the load circuit is open and the voltage sensed by the voltage sensing unit 210 is low, the power cut-off operating point executed by the power control unit 220 becomes the horizontal drive circuit 42.

As set forth in the foregoing, a display device constructed according to the principles of the present invention includes additional voltage sensing unit and power control unit in a load circuit which acts as a load within a horizontal deflection output circuit, such that the horizontal deflection output circuit can be prevented from being destroyed according to opening of the load circuit.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A display device having a set protecting function upon generation of an abnormal voltage, said display device comprising:

a monitor including a deflection yoke connector;

a power supply circuit for supplying a direct current voltage;

a horizontal deflection circuit including a horizontal oscillating circuit for forming a toothed waveform in accordance with charging and discharging of a capacitor by using the direct current voltage supplied from said power supply circuit to thereby oscillate a frequency of the toothed waveform, a horizontal drive circuit for driving an output pulse of said horizontal oscillating circuit, a horizontal deflection output circuit for forming a toothed waveform of current through the deflection yoke connector in accordance with the output pulse driven by said horizontal drive circuit, and a load circuit driven by a predetermined energy from said horizontal deflection output circuit; and an abnormal voltage detector for sensing a state of the predetermined energy transmitted to said load circuit, when the deflection yoke connector of said monitor is disconnected from the horizontal deflection output circuit and when said horizontal deflection circuit is in an abnormal state, thereby preventing said horizontal deflection circuit from being damaged.

2. The display device of claim 1, further comprised of said abnormal voltage detector generating an output signal for controlling the direct current voltage supplied to said horizontal oscillating circuit from said power supply circuit.

3. The display device of claim 1, further comprised of said abnormal voltage detector generating an output signal for controlling the direct current voltage supplied to said horizontal drive circuit from said power supply circuit.

4. The display device of claim 1, further comprised of said abnormal voltage detector switching operation of said horizontal deflecting circuit into a suspend mode based upon the state of the predetermined energy transmitted to said load circuit.

5. A display device having a set protecting function upon generation of an abnormal voltage, said display device comprising:

a monitor including a deflection yoke connector;

a power supply circuit for supplying a direct current voltage;

a horizontal deflection circuit including a horizontal oscillating circuit for forming a toothed waveform in accordance with charging and discharging of a capacitor by using the direct current voltage supplied from said power supply circuit to thereby oscillate a frequency of the toothed waveform, a horizontal drive circuit for driving an output pulse of said horizontal oscillating circuit, a horizontal deflection output circuit for forming a toothed waveform of current through the deflection yoke connector in accordance with the output pulse driven by said horizontal drive circuit, and a load circuit driven by a predetermined energy from said horizontal deflection output circuit;

an abnormal voltage detector for sensing a state of the predetermined energy transmitted to said load circuit, when the deflection yoke connector of said monitor is disconnected from the horizontal deflection output or when said horizontal deflection circuit is in an abnormal state, thereby preventing said horizontal deflection circuit from being damaged, said abnormal voltage detector further comprising:

a voltage sensing unit for sensing a state of the predetermined energy of said horizontal deflection output circuit supplied to said load circuit; and a power control unit for controlling the direct current voltage supplied to said horizontal oscillating circuit from said power supply circuit, when a reference voltage is not supplied to said load circuit in accordance with a sensing result of said voltage sensing unit.

6. The display device of claim 5, further comprised of said power control unit comprising a switching transistor operated in accordance with a voltage difference between a detected voltage of the voltage sensing unit and a reference voltage.

7. A display device having a set protecting function upon generation of an abnormal voltage, said display device comprising:

a monitor including a deflection yoke connector;

a power supply circuit for supplying a direct current voltage;

a horizontal deflection circuit including a horizontal oscillating circuit for forming a toothed waveform in accordance with charging and discharging of a capacitor by using the direct current voltage supplied from said power supply circuit to thereby oscillate a frequency of the toothed waveform, a horizontal drive circuit for driving an output pulse of said horizontal oscillating circuit, a horizontal deflection output circuit for forming a toothed waveform of current through the deflection yoke connector in accordance with the output pulse driven by said horizontal drive circuit, and a load circuit driven by a predetermined energy from said horizontal deflection output circuit; and an abnormal voltage detector for sensing a state of the predetermined energy transmitted to said load circuit, when the deflection yoke connector of said monitor is disconnected from the horizontal deflection output circuit or when horizontal deflection circuit is in an abnormal state, thereby preventing said horizontal deflection circuit from being damaged, said abnormal voltage detector further comprising:

a first pulse input unit having an input terminal coupled to receive a flyback pulse according to the connection of the deflection yoke connector, a serially connected first and second capacitors and an output terminal connected between said first and second capacitors;

a rectifier for rectifying the flyback pulse from the output terminal of said first pulse input unit to produce a direct current voltage;

a voltage divider for dividing the direct current voltage applied from the rectifier to produce a divided voltage;

a second pulse input unit having an input terminal coupled to receive a rectangular pulse and a serially connected resistor and diode to produce a reference voltage;

a switch control unit having a serially connected resistor and a Zener diode connected between the voltage divider and the second pulse input unit, for generating a switch control current indicating that said abnormal voltage detector is normally connected to said deflection yoke connector, when the divided voltage is greater than said reference voltage, and alternatively for not generating said switch control current indicating that said abnormal voltage detector is not connected to said deflection yoke connector, when the divided voltage is not greater than said reference voltage; and a switch for switching in accordance with the switch control current applied from said switch control unit to produce a power control signal to control power supply from said power supply circuit to thereby preventing said horizontal deflection circuit from being damaged.

8. The display device of claim 7, further comprised of said switch comprising:

a first transistor having a first electrically conducting electrode connected to a first power terminal via a first resistor, a second electrically conducting electrode conducting electrode connected to a second power terminal, and a control electrode coupled to receive said switch control current via a second resistor; and a second transistor having a first electrically conducting electrode connected to an output terminal providing said power control signal, a second electrically conducting electrode conducting electrode connected to said second power terminal, and a control electrode connected to said first electrically conducting electrode of said first transistor via a third resistor.

9. A display device having a set protecting function upon generation of an abnormal voltage, comprising:

a horizontal deflection circuit for providing a horizontal signal to a deflection yoke connector included in a monitor;

a high voltage output circuit for supplying a high voltage to an anode of the monitor in accordance with an oscillating signal applied from said horizontal deflection circuit;

a power supply circuit for supplying power to said horizontal deflection circuit; and an abnormal voltage detector disposed between said deflection yoke connector, said high voltage output circuit and said power supply circuit, for detecting whether said deflection yoke connector is connected to said horizontal deflection circuit and whether said high voltage output circuit is damaged, to thereby control a power output of said power supply circuit in accordance with a detected result.

10. The display device of claim 9, further comprised of said abnormal voltage detector generating an output signal for controlling the power output from said power supply circuit to said horizontal deflection circuit to prevent said horizontal deflection circuit from being damaged.

11. The display device of claim 9, further comprised of said abnormal voltage detector generating an output signal for controlling the power output from said power supply circuit to said high voltage output circuit to prevent said high voltage output circuit from being damaged.

12. The display device of claim 9, further comprised of said horizontal deflection circuit comprising:

a horizontal oscillating circuit for generating said oscillating signal after forming a toothed waveform in accordance with charging and discharging of a capacitor by using the direct current voltage supplied from said power supply circuit;

a horizontal drive circuit for driving said oscillating signal from said horizontal oscillating circuit;

a horizontal deflection output circuit for forming a toothed waveform of current through the deflection yoke connector in accordance with an output pulse driven by said horizontal drive circuit; and a load circuit driven by energy from said horizontal deflection output circuit.

13. The display device of claim 12, further comprised of said abnormal voltage detector comprising:

a voltage sensing unit for sensing a state of the energy of said horizontal deflection output circuit supplied to said load circuit; and a power control unit for controlling the power supplied from said power supply circuit to said horizontal deflection circuit, when a reference voltage is not supplied to said load circuit in accordance with a sensing result of said voltage sensing unit.

14. The display device of claim 13, further comprised of said power control unit comprising a switching transistor operated in dependence upon a voltage difference between a detected voltage of the voltage sensing unit and a reference voltage.

15. The display device of claim 12, further comprised of said abnormal voltage detector comprising:

a first pulse input unit having an input terminal coupled to receive a flyback pulse according to the connection of the deflection yoke connector, a serially connected first and second capacitors and an output terminal connected between said first and second capacitors;

a rectifier for rectifying the flyback pulse from the output terminal of said first pulse input unit to produce a direct current voltage;

a voltage divider for dividing the direct current voltage applied from the rectifier to produce a divided voltage;

a second pulse input unit having an input terminal coupled to receive a rectangular pulse and a serially connected resistor and diode to produce a reference voltage;

a switch control unit having a serially connected resistor and a Zener diode connected between the voltage divider and the second pulse input unit, generating a switch control current indicating that said abnormal voltage detector is normally connected to said deflection yoke connector, when the divided voltage is greater than said reference voltage, and alternatively for not generating said switch control current indicating that said abnormal voltage detector is not connected to said deflection yoke connector, when the divided voltage is not greater than said reference voltage; and a switch for switching in accordance with the switch control current applied from said switch control unit to produce a power control signal to control power supply from said power supply circuit and protect said horizontal deflection circuit from being damaged.

16. The display device of claim 15, further comprised of said switch comprising:

a first transistor having a first electrically conducting electrode connected to a first power terminal via a first resistor, a second electrically conducting electrode connected to a second power terminal, and a control electrode coupled to receive said switch control current via a second resistor; and a second transistor having a first electrically conducting electrode connected to an output terminal providing said power control signal, a second electrically conducting electrode connected to said second power terminal, and a control electrode connected to said first electrically conducting electrode of said first transistor via a third resistor.

17. A display device having a set protecting function upon generation of an abnormal voltage, comprising:

a cathode-ray tube including a deflection yoke connector;

a power supply circuit for supplying a direct current voltage;

a horizontal deflection circuit connected to said power supply circuit for providing a horizontal signal to the deflection yoke connector of said cathode-ray tube;

a high voltage output circuit connected to said horizontal deflection circuit for supplying a high voltage to an anode of said cathode-ray tube; and an abnormal voltage detector disposed between said deflection yoke connector of said cathode-ray tube, said horizontal deflection circuit, and said high voltage output circuit, for detecting presence of an abnormal voltage indicative of when said deflection yoke connector of said cathode-ray tube is disconnected from said horizontal deflection circuit and when said horizontal deflection circuit is in an abnormal state so as to control output of said direct current voltage from said power supply circuit.

18. The display device of claim 17, further comprised of said abnormal voltage detector generating an output signal for controlling the direct current voltage supplied to said horizontal deflection circuit from said power supply circuit to prevent said horizontal deflection circuit from damages due to the presence of said abnormal voltage.

19. The display device of claim 17, further comprised of said horizontal deflection circuit comprising:

a horizontal oscillating circuit for forming a toothed waveform in accordance with charging and discharging of a capacitor by using the direct current voltage supplied from said power supply circuit;

a horizontal drive circuit driving an output pulse of said horizontal oscillating circuit;

a horizontal deflection output circuit forming a toothed waveform of current through the deflection yoke connector in accordance with the output pulse driven by said horizontal drive circuit; and a load circuit driven by energy from said horizontal deflection output circuit.

20. The display device of claim 19, further comprised of said abnormal voltage detector comprising:

a voltage sensing unit sensing a state of the predetermined energy of said horizontal deflection output circuit supplied to said load circuit; and a power control unit controlling the direct current voltage supplied to said horizontal oscillating circuit from said power supply circuit, when a reference voltage is not supplied to said load circuit in accordance with a sensing result of said voltage sensing unit.

21. The display device of claim 20, further comprised of said power control unit comprising a switching transistor operated in dependence upon a voltage difference between a detected voltage of the voltage sensing unit and a reference voltage.

22. The display device of claim 19, further comprised of said abnormal voltage detector comprising:

a first pulse input unit having an input terminal coupled to receive a flyback pulse according to the connection of the deflection yoke connector, a serially connected first and second capacitors and an output terminal connected between said first and second capacitors;

a rectifier rectifying the flyback pulse from the output terminal of said first pulse input unit to produce a direct current voltage;

a voltage divider dividing the direct current voltage applied from the rectifier to produce a divided voltage;

a second pulse input unit having an input terminal coupled to receive a rectangular pulse and a serially connected resistor and diode to produce a reference voltage;

a switch control unit having a serially connected resistor and a Zener diode connected between the voltage divider and the second pulse input unit, for generating a switch control current indicating that said abnormal voltage detector is normally connected to said deflection yoke connector, when the divided voltage is greater than said reference voltage, and alternatively not generating said switch control current indicating that said abnormal voltage detector is not connected to said deflection yoke connector, when the divided voltage is not greater than said reference voltage; and a switch switching in accordance with the switch control current applied from said switch control unit to produce a power control signal to control power supply from said power supply circuit to thereby preventing said horizontal deflection circuit from being damaged.

23. The display device of claim 22, further comprised of said switch comprising:

a first transistor having a first electrically conducting electrode connected to a first power terminal via a first resistor, a second electrically conducting electrode connected to a second power terminal, and a control electrode coupled to receive said switch control current via a second resistor; and a second transistor having a first electrically conducting electrode connected to an output terminal providing said power control signal, a second electrically conducting electrode connected to said second power terminal, and a control electrode connected to said first electrically conducting electrode of said first transistor via a third resistor.

24. The display device of claim 17, further comprised of said abnormal voltage detector generating an output signal controlling the direct current voltage output from said power supply circuit to said high voltage output circuit to prevent said high voltage output circuit from damages due to the presence of said abnormal voltage.

* * * * *